(12) United States Patent
Goss et al.

(10) Patent No.: US 7,013,129 B2
(45) Date of Patent: Mar. 14, 2006

(54) QUEUING FOR RADIO CHANNEL AVAILABILITY

(75) Inventors: Stephen C. Goss, Wheaton, IL (US); Jeffrey Ross Light, Lincolnwood, IL (US); Chung-Zin Liu, Naperville, IL (US); Omar Hernando Salvador, Wheaton, IL (US); Gitesh P. Shah, Naperville, IL (US); Mark Kevin Stockert, Singapore (SG); Kenneth Wayne Strom, Naperville, IL (US); Charles Varvaro, Glendale Heights, IL (US); Randall Joe Wilson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 451 days.

(21) Appl. No.: 09/882,697

(22) Filed: Jun. 14, 2001

(65) Prior Publication Data

US 2002/0193119 A1   Dec. 19, 2002

(51) Int. Cl.
```
H04M 1/00    (2006.01)
H04M 1/64    (2006.01)
H04M 3/42    (2006.01)
H04Q 1/00    (2006.01)
H04B 7/00    (2006.01)
```

(52) U.S. Cl. .................. 455/414.1; 455/416; 455/450; 455/465; 455/517; 455/555; 379/84; 379/209.01; 379/210.01; 379/266.05; 370/215

(58) Field of Classification Search ........ 455/453–455, 455/434, 440, 446, 447, 449, 450–451, 452.1, 455/452.2, 464, 560, 561, 414.1, 416, 465, 455/517, 555, 67.11; 379/201.12, 201.03, 379/201.1, 203.01, 204.01, 205.01, 207.02, 379/207.05, 207.06, 207.07, 208.01, 209.01, 379/210.01, 260, 261, 262–264, 267, 215.01, 379/207.16, 265.01, 265.14, 266.03–266.26, 379/84; 370/215
See application file for complete search history.

(56) References Cited

U.S. PATENT DOCUMENTS 3,824,597 A  *  7/1974  Berg ........................... 370/215

(Continued)

*Primary Examiner*—William D. Cumming

(57) ABSTRACT

Apparatus and a method for establishing a cellular mobile call. If no radio traffic (voice or data) channels are available for a calling Mobile Station (MS), then a test is made to determine the expected wait time before a channel becomes available. If the expected wait time is less than a first threshold, then the call request is queued. If a channel does not become available before a second time threshold, then the caller is notified that the call has been queued and is expected to be established in a short time. A control message is sent to the MS to trigger an indication of the queued status to the user. The indication may be one or more tones, a data display, or the playing of a pre-recorded announcement. If the expected wait time is more than the first threshold, the caller is given the opportunity to be called back when a radio channel becomes available. Advantageously, the number of failed calls because of unavailable traffic channels is reduced, and the caller's annoyance level is reduced.

20 Claims, 4 Drawing Sheets

U.S. PATENT DOCUMENTS

Figure 1:
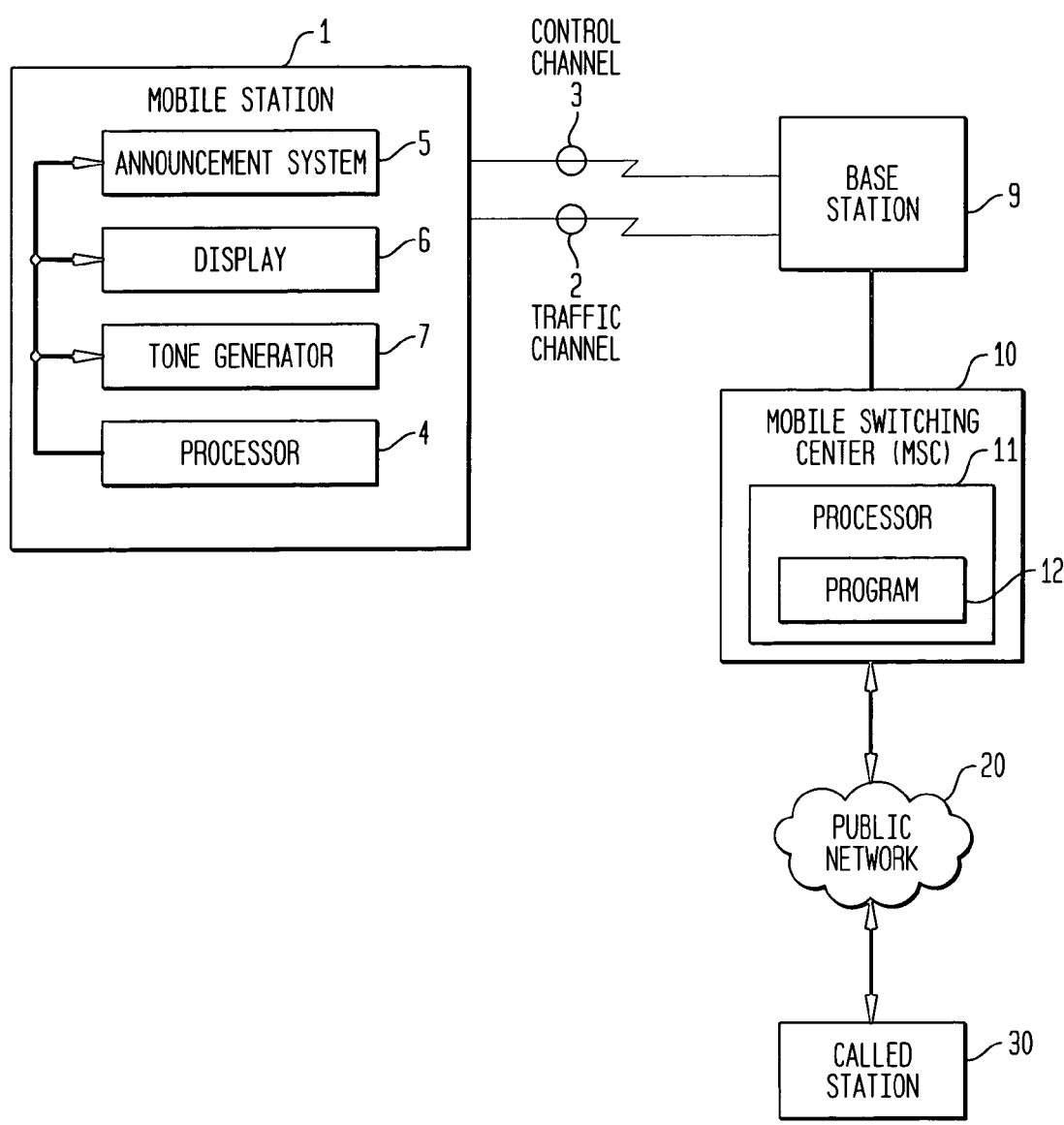

| | | | | |
|---|---|---|---|---|
| 4,788,715 A | * | 11/1988 | Lee | 379/84 |
| 4,953,204 A | * | 8/1990 | Cuschleg et al. | 379/266.05 |
| 5,260,993 A | * | 11/1993 | Breeden et al. | 455/465 |
| 5,311,583 A | * | 5/1994 | Friedes et al. | 379/210.01 |
| 5,414,750 A | * | 5/1995 | Bhagat et al. | 455/416 |
| 5,752,185 A | * | 5/1998 | Ahuja | 455/414.1 |
| 5,794,156 A | * | 8/1998 | Alanara | 455/517 |
| 6,009,157 A | * | 12/1999 | Bales et al. | 379/209.01 |
| 6,154,644 A | * | 11/2000 | Murray | 455/414.1 |
| 6,654,615 B1 | * | 11/2003 | Chow et al. | 455/555 |
| 6,658,255 B1 | * | 12/2003 | Goss et al. | 455/450 |

\* cited by examiner

QUEUING FOR RADIO CHANNEL AVAILABILITY

RELATED APPLICATION

This Application is related to an Application entitled, "Improved Human Interface for Wireless Telephone Stations", Ser. No. 09/517,027, and assigned to the same Assignee, and to an application entitled, "Enhanced Wireless Radio Channel Utilization", Ser. No. 09/517,687, and assigned to the same Assignee, both filed Mar. 2, 2000.

TECHNICAL FIELD

This invention relates to the utilization of radio traffic channels in a cellular wireless telecommunications system.

PROBLEM

In a cellular wireless telecommunications system, the final stage of a connection to a mobile station (MS) involves the use of a radio channel, a traffic (voice or data) channel from a base station, connected to a host controller such as a mobile switching center (MSC). The number of radio traffic channels available from any base station is limited by a number of factors dependent upon the specific radio technology used and the allotted bandwidth of the base station. In some cases, if all the traffic channels at a preferred base station capable of receiving the signal from the MS are occupied, an alternate base station having available channels can serve the call. However, if this is not the case, the call cannot be set up, and is effectively blocked.

Mobile stations also communicate with their host controller, such as a controlling mobile switching center (MSC) by a radio control channel, which is available even if no radio traffic channels are available. Thus, it is possible to signal a mobile station to inform it that it cannot originate a call because no traffic channels are available.

Even though in many or most cases, the number of traffic channels available is adequate for handling the required traffic, there are cases in which sudden peaks of traffic exceed the capabilities of the radio system. For example, if a large airplane lands at an airport, many of the passengers immediately try to make a cellular call. Under those circumstances, if a particular mobile station cannot get a traffic channel, the mobile station keeps sending set-up messages on a control channel, (typically when the user presses the end and then the send buttons), thus flooding the MSC with an excessive number of requests, and possibly creating processing load problems for the MSC. Further, the calling station has no way of ensuring that the first available channel will not be seized for a call by a caller who tried much later.

A problem with the prior art, therefore, is that service is badly degraded if the number of radio channels is inadequate at a particular time.

SUMMARY OF THE INVENTION

Applicants have carefully studied this problem, and have recognized that the number of traffic channels available in most cellular systems for accessing a particular mobile station is generally large. If all of these traffic channels are busy, the likelihood that one will become available in a short time, or even that a small number of traffic channels will become available in a short time, is substantial. Therefore, in accordance with Applicants' invention, when no traffic channels are available, mobile stations can be queued up for out-going calls, and the callers can disconnect and be called back when a channel becomes available.

In accordance with Applicants' invention, if a call set-up message is received by a host controller such as a mobile switching center (MSC) and no traffic channel is available, the MSC tests whether the expected delay until a traffic channel becomes available is less than some parameter, say N seconds. If not, then the mobile station is informed of the unavailability of radio channels. If a caller who has subscribed to call-back service then requests call-back, he/she is placed in a queue and is disconnected. When the caller reaches the head of the queue and a channel becomes available, the caller is called back and the call can be completed. Advantageously, the caller need not be connected while waiting.

If a channel is expected to be available in less than N seconds, the MSC simply waits and tries to set up a connection to the MS when a channel becomes available. If the elapsed time exceeds M seconds and no traffic channel has become available, the caller is notified and, effectively, has the choice of either waiting longer until a traffic channel is available, or disconnecting. The "no channel available" notification to the caller can be made by a message sent over the control channel which, in the MS, results in a displayed message; or the generation of a tone or a tone cadence; or, in the generation of a message for triggering an announcement (as described in the Related Applications). The latter choice has the advantage over a display, because the caller will probably have the MS up to his/her ear, and therefore will not see the display.

In an alternative arrangement, customers who have subscribed to call-back service can invoke call-back service if the expected wait time is less than N seconds, but M seconds have already elapsed.

Advantageously, this arrangement allows for a significant decrease in the number of calls blocked because of unavailability of a traffic channel. Advantageously, this type of arrangement for outgoing calls may significantly alleviate the problem of callers repeatedly sending set-up messages when no traffic channels are available, and can decrease the annoyance level of such callers.

BRIEF DESCRIPTION OF THE DRAWING(S)

Figure 2A:
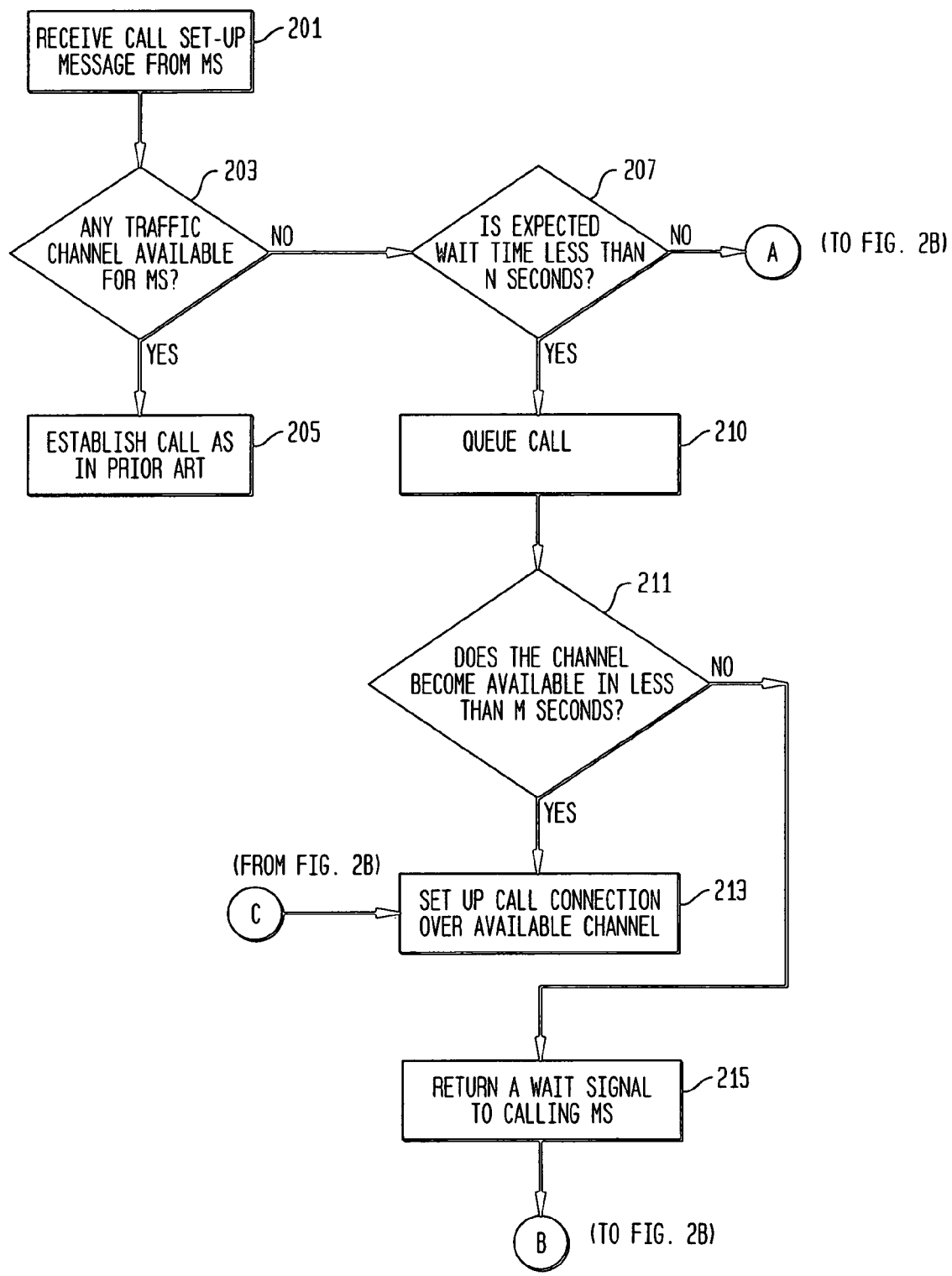
Figure 2B:
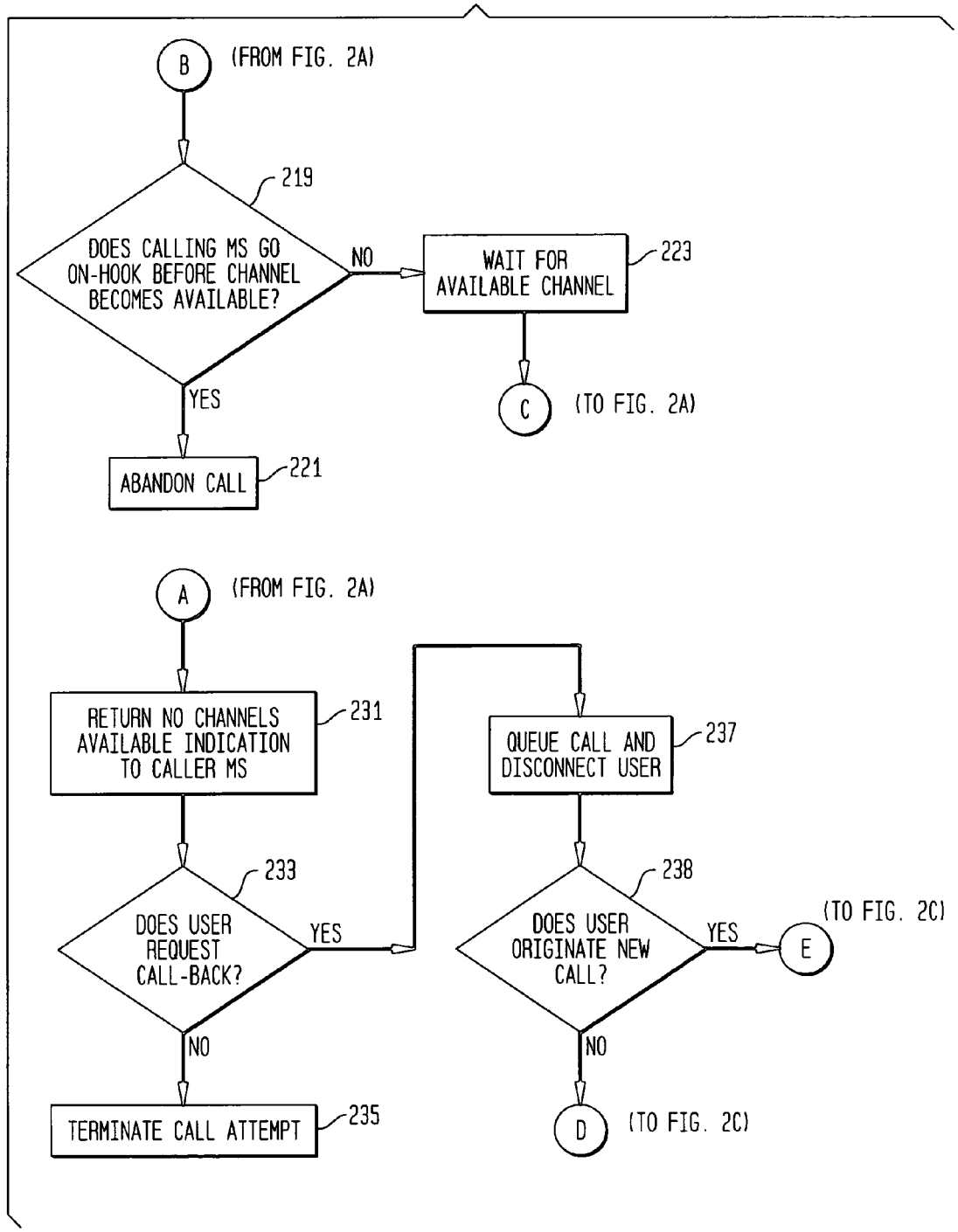
Figure 2C:
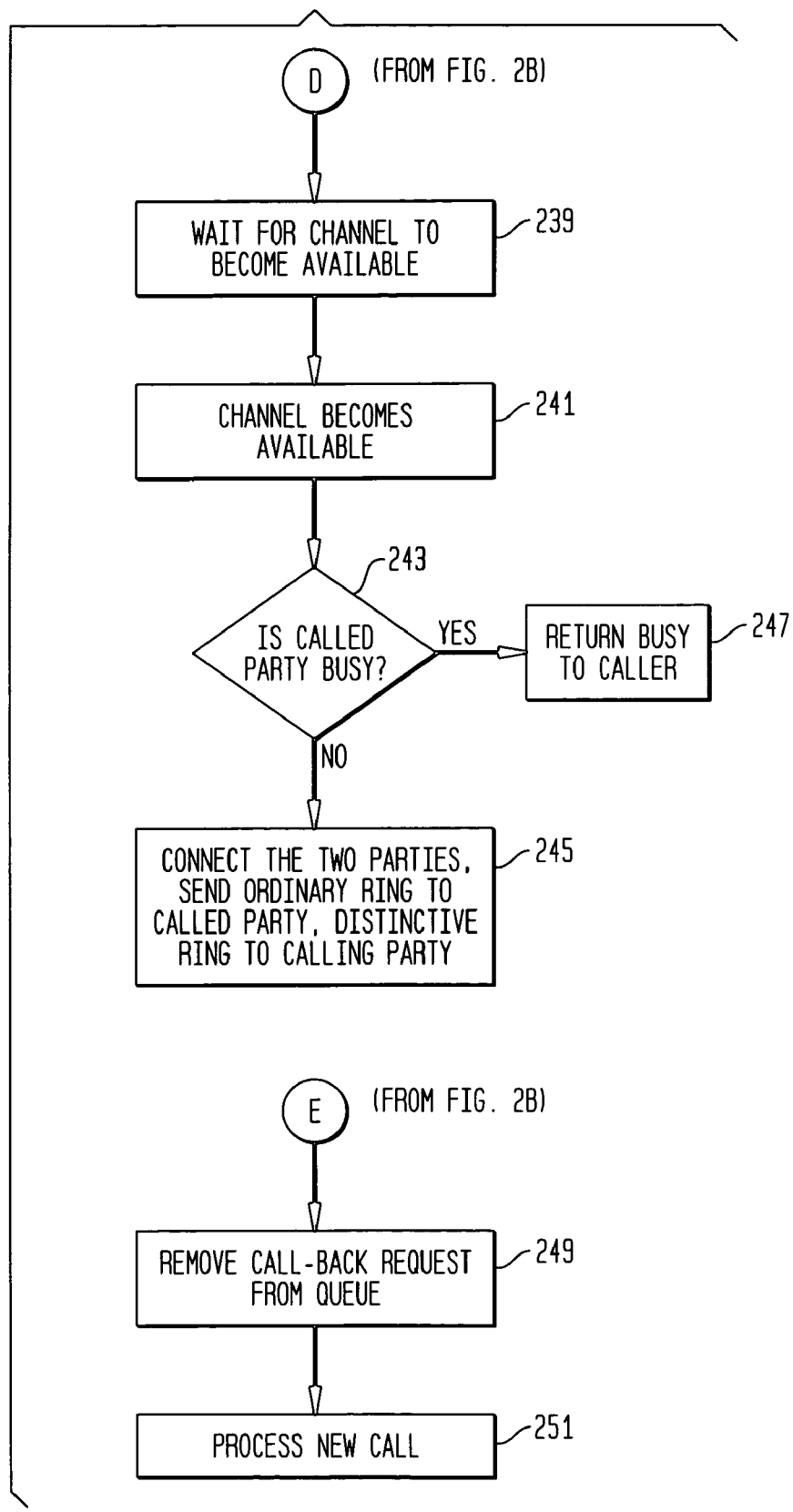

FIG. 1 is a block diagram, illustrating the operation of Applicants' invention; and FIG. 2 illustrates the processing of an outgoing call.

DETAILED DESCRIPTION

FIG. 1 is a block diagram showing a Mobile Station (MS) (1), a Base Station (BS) (9), and a Host Controller, in this case a Mobile Switching Center (MSC) (10). The MSC is connected via Public Network (20) to a Called Station (30). Clearly, the Called Station (30) can also be a Mobile Station or a Land-Line Station. The Mobile Station is connected to a Base Station via a radio traffic (voice or data) Channel (2), and a Radio Control Channel (3). Even if no Traffic Channels are available, messages can be sent over the Control Channel.

The Mobile Station (1) includes a Processor (4), such as a Microprocessor and associated memory, and three possible means to indicate to a caller that the System is waiting for an available Traffic Channel. One possible indicator is a Tone Generator (7) for generating single or cadenced tones; prior art MSs are already equipped with Tone Generators for generating tones for transmission over a Traffic Channel to access, for example, a bank account database. Another possible indicator is a Display (6) of a modest number of characters available on prior art MSs. A disadvantage of using the Display, is that users normally hold their phones to their ears while making a call. A tone can accompany a Display, and the users can be trained to look at the Display when they hear the tone. A third possible indicator in the MS, as described in the Related Applications, is an Announcement System (5), which responds to an appropriate message or set of messages received over the Control Channel by generating a pre-recorded voice announcement. For example, the voice announcement might say, "Please wait another 10 seconds for the System to set-up your call".

The Mobile Switching Center (10), includes a Processor and associated memory (11), controlled by a Program (12), for queuing requests to make outgoing calls. The Processor memory also contains information to identify the users who have subscribed to call-back service, as well as default preferences selected by each user when he/she signs up for service. The default preferences can include whether the caller wishes to have call-back service provided automatically on all calls; in which case, the caller can still cancel call-back for a particular call by dialing a code, or whether the caller wishes to have call-back service only if specifically requested (e.g., by dialing a code), in which case the normal, non-call-back treatment is the default treatment.

FIG. 2 is a flow diagram illustrating the operation of an outgoing call from an MS. The MSC receives a call set-up message from the calling MS, Action Block (201). The MSC then tests whether a traffic channel is available for the calling MS, Test (203). If so, then the call is established as in the prior art, Action Block (205). If not, the MSC tests whether the expected wait time for a channel is less than N seconds, Test (207). If the expected wait time is less than N seconds, the call is queued, Action Block (210). Then, Test (211) determines whether or not a channel becomes available in less than M seconds. If so, then the call connection is set up over the available channel, Action Block (213). If no channel becomes available in M seconds, then a wait signal is returned to the caller MS, Action Block (215). The wait signal can be an announcement indicating that an expected wait time of P seconds is likely to be encountered. Test (219) determines whether the calling MS goes on-hook before a channel becomes available. If so, the call is abandoned, (Action Block 221). Otherwise, the MSC waits for an available channel, (Action Block 223), and when that channel becomes available, sets up a connection over the available channel, Action Block (213).

It may be desirable to have a longer expected wait time threshold N, but to inform the caller after a shorter interval of time M, so that the caller does not feel abandoned. The choice of M, N, and P is likely to be determined by field experience, and may be subject to the preferences of a particular carrier.

If the expected wait time is not less than N seconds (negative result of Test 207), then a "No Channels Available" indication is returned to the caller Main Station, Action Block (231). This indication can be one of the indications discussed above, including the tone produced by a Tone Generator (7) or a Display (6), or an Announcement System (5) within the Mobile Station. In response to receipt of this "No Channels Available" indication, a user who has been provided with this service may request "Call-Back", (Test 233). (Users who have not been provided with this service are treated as if they had not requested call-back). The user may signal for a call-back through the absence of a signal accompanying the end signal, or according to the user's default preference, may signal for a call-back by keying or dialing a signal such as * and/or one or more digits to request a call-back. If the user has indicated that he/she does not wish to be called back, (in accordance with the user's default preference), the call attempt is simply terminated, Action Block (235), and the call record is cleared. If the user has indicated a request for call-back, then the call record is retained, and the call is queued, Action Block (237). Test (238) is used to determine whether the user originates a new call. If not, the system waits for an available channel until prior requests for such a channel have been accommodated, Action Block (239). When a channel becomes available, Action Block (241), Test (243) is used to determine if the called party is busy. This Test is a test of the called party without attempting to actually establish a connection. If the test results in an indication that the called party is not busy, then the MSC controls the establishment of a connection to both parties; ordinary ring is sent to the called party, and a distinctive ring is sent to the calling party that this not an incoming call, but the completion of the requested call-back call, Action Block (245). If the called party is busy, then "Busy" tone is returned to the caller, Action Block (247).

If the user originates a new call, ("Yes" output of Test 238), then the call-back request is removed from the queue, and call records for the call-back request are deleted, (Action Block (249). The new call is then processed, Action Block (251).

In an alternative embodiment, the call-back treatment discussed with respect to Blocks (233-251), can be provided for the "Yes" output of Test (219), by substituting these Blocks for Action Block (221). This would offer call-back service to customers who have subscribed to this service, even if the expected wait time is less than N seconds, but has already exceeded M seconds.

The above description is of one preferred embodiment of Applicants' invention. Other embodiments will be apparent to those of ordinary skill in the art. The application is limited only by the attached claims.

What is claimed is:

1. In a mobile cellular switching network, a method of establishing a cellular call from a cellular station comprising the steps of:

signaling a request for service comprising an identification of a destination station, over a control channel between said cellular station and a base station;

if a serving mobile switching center detects that a radio traffic channel between said mobile station and any base station is available, establishing a connection to the base station having said available channel over the available radio traffic channel;

if said serving mobile switching center detects that no radio traffic channel is available between said mobile station and any base station, allowing said mobile station to go on-hook and disconnecting the control channel while the network waits for a radio traffic channel between said mobile station and any base station to become available;

when a radio traffic channel becomes available, calling said mobile station back; and when the mobile station goes off-hook, establishing a connection over the available radio traffic channel.

2. The method of claim 1, wherein prior to said mobile station going on-hook, said serving mobile switching center determines whether an expected wait time for an available channel exceeds a first threshold; and disconnecting said control channel only for those cases in which the expected wait time exceeds said first threshold.

3. The method of claim 1, further comprising the steps of:
prior to calling said mobile station back, testing whether the identified destination station is busy; and
if the identified destination station is busy, avoiding calling said mobile station back.

4. The method of claim 1, further comprising the steps of:
prior to calling said mobile station back, testing whether the identified destination station is busy; and if the identified destination station is busy, returning a busy signal to the mobile station.

5. The method of claim 1, wherein prior to disconnecting said control channel, the mobile switching center determines whether an expected wait time for an available radio traffic channel exceeds a first threshold;
- if the expected wait time for an available radio traffic channel exceeds said first threshold, offering to call back said mobile station;
- if the expected wait time does not exceed said first threshold, waiting until the lapse of time of a second threshold, said second threshold smaller than said first threshold;
- if a radio traffic channel becomes available before a lapse of time of said second threshold, when the mobile station goes off-hook, establishing a connection over said available radio traffic channel;
- if no channel becomes available during the lapse of time of the second threshold, offering to call back said mobile station.

6. The method of claim 1, wherein the step of calling back the mobile station comprises the step of:
- calling back the mobile station using a distinctive ringing signal.

7. The method of claim 1, wherein a service of calling back said mobile station is offered only to mobile stations subscribing to said service.

8. The method of claim 7, wherein mobile station subscribers to said service are provided with a default treatment;
- wherein the default treatment is one of automatic call-back service and no call-back service.

9. The method of claim 1, wherein if said mobile station originates a new call while waiting for a call back, a call back feature is canceled for this call.

10. The method of claim 1, further comprising the steps of:
- retaining a call record comprising said identification of said station of said terminating party during an interval between a time that the mobile station goes on-hook and a time when the mobile station is called back.

11. In a mobile cellular switching network, apparatus for establishing a cellular call from a mobile station, comprising:
- means for transmitting a request for service, comprising an identification of a destination station, over a control channel between said mobile station and a base station;
- means, responsive to a serving mobile switching center detecting that a radio traffic channel between said mobile station and any base station is available, for establishing a connection toward said cellular station over the available radio traffic channel;
- means, responsive to said serving mobile switching center detecting that no radio traffic channel is available between said mobile station and any base station, for disconnecting said control channel while said mobile station goes on-hook and while the network waits for a radio traffic channel between said mobile station and any base station to become available;
- means for calling said mobile station back when a radio traffic channel between said mobile station and any base station becomes available; and
- means, responsive to the mobile station going off-hook, for establishing a connection between said mobile station and a base station over the available radio traffic channel.

12. The apparatus of claim 11 wherein:
- prior to disconnecting said control channel, said mobile switching system determining whether an expected wait time for an available channel exceeds a first threshold; and
- said mobile switching center calling back said mobile station only for those cases in which the expected wait time exceeds said first threshold.

13. The apparatus of claim 11, wherein said means for calling back said mobile station comprises:
- means for determining whether the identified destination station is busy prior to calling back said mobile station; and
- means, responsive to a determination that said identified station of said terminating party is busy, for avoiding an attempt to establish a connection toward said identified station.

14. The apparatus of claim 11, wherein said means for calling back said mobile station comprises:
- means for determining whether the identified destination station is busy prior to calling back said mobile station; and
- means, responsive to a determination that said identified destination station is busy, for returning a busy signal to the mobile station.

15. The apparatus of claim 11,
- wherein prior to disconnecting said control channel, said mobile switching center determines whether an expected wait time for an available radio traffic channel exceeds a first threshold;
- if the expected wait time for an available radio traffic channel exceeds said first threshold, the mobile switching center offers to call back the mobile station;
- if the expected wait time does not exceed a first threshold, the mobile switching center waits until the elapse of time of a second threshold, said second threshold smaller than said first threshold;
- if a radio traffic channel becomes available before an elapse of time of said second threshold, when the mobile station goes off-hook, establishing a connection over said available radio traffic channel; and
- if no radio traffic channel becomes available prior to an elapse of time of the second threshold, the mobile switching center offers to call back the mobile station.

16. The apparatus of claim 11, wherein said means for calling back said mobile station comprises:
- means for calling back the mobile station using a distinctive ringing signal.

17. The apparatus of claim 11, wherein the means for calling back the mobile station is activated only for mobile stations subscribing to a call-back service.

18. The apparatus of claim 17, wherein mobile stations subscribing to said call-back service are provided with a default treatment;
- wherein the default treatment is one of automatic call-back service and no call-back service.

19. The apparatus of claim 11, wherein if the mobile station originates a new call while waiting for a call back, a call back feature is canceled for this call.

20. The apparatus of claim 11, wherein said mobile switching center retains a call record during an interval between a time that the mobile station goes on-hook and a time when the mobile station is called back;
- wherein said call record comprises a calling and a called number.

* * * * *